No. 880,978. PATENTED MAR. 3, 1908.
T. A. EDISON.
ELECTRODE ELEMENT FOR STORAGE BATTERIES.
APPLICATION FILED NOV. 2, 1905.
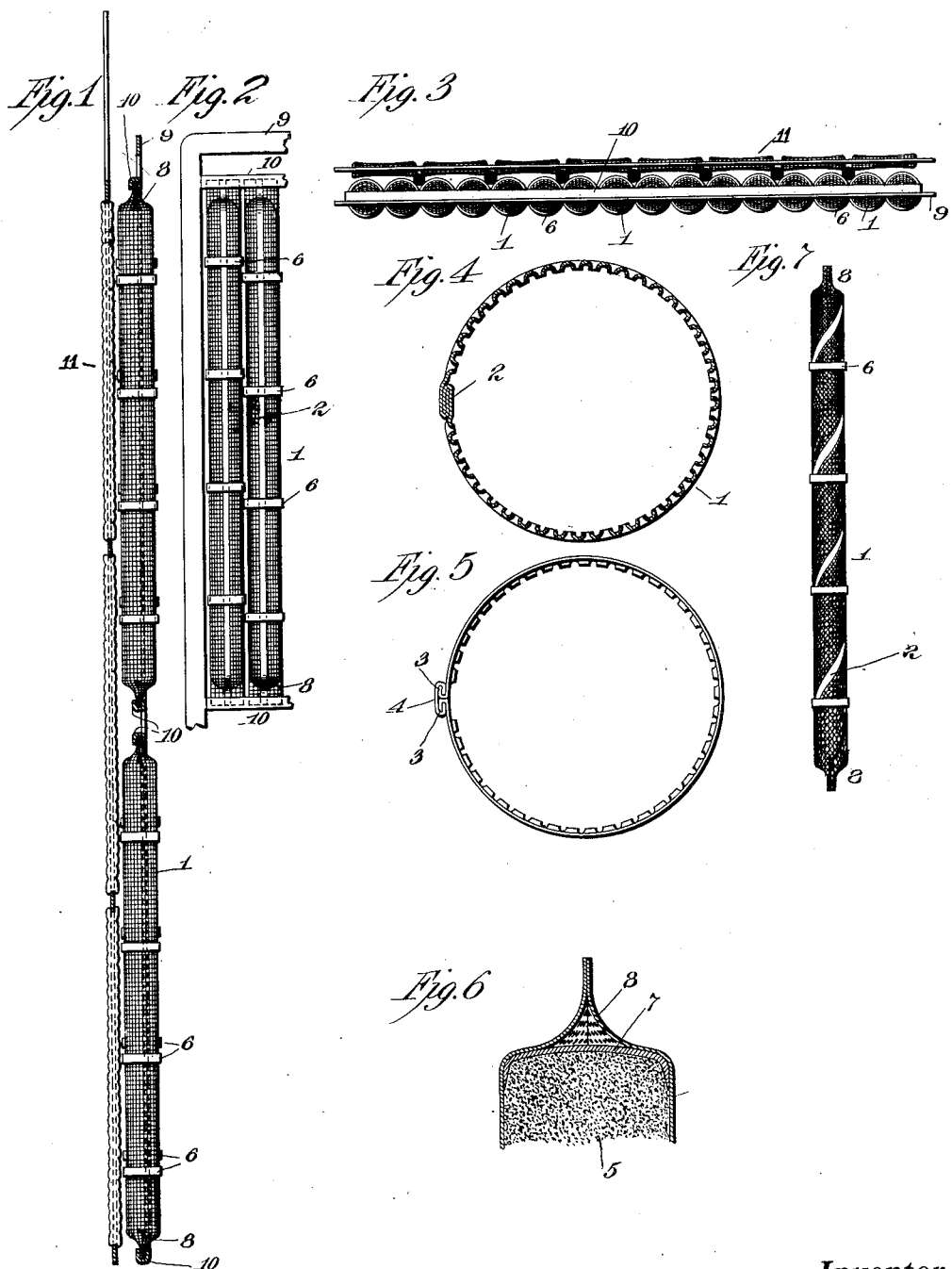
Witnesses:
Delos Holden
Anna R. Klehm
Inventor
Thomas A. Edison
by Frank L. Dyer
Attorney

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

ELECTRODE ELEMENT FOR STORAGE BATTERIES.

No 880,978.        Specification of Letters Patent.        Patented March 3, 1908.

Application filed November 2, 1905. Serial No. 285,650.

*To all whom it may concern:*

Be it known that I, THOMAS ALVA EDISON, a citizen of the United States, residing at Llewellyn Park, Orange, county of Essex, and State of New Jersey, have invented a certain new and useful Electrode Element for Storage Batteries, of which the following is a description.

My invention relates to an improved electrode element for storage batteries of the Edison type; and particularly to the make-up of the positive or nickel electrodes. With the Edison battery as first designed by me, the electrode elements were formed of grids carrying perforated, nickel-plated, corrugated and concaved pockets, containing the active material under an elastic pressure; (see Patents Nos. 704,305, dated July 8th, 1902 and 723,449, dated March 24th, 1903.) In the make-up of the negative electrodes, I described a mixture of electrolytically active and finely divided iron and mercury, or some other readily reducible metal; (see Patents Nos. 723,450, dated March 24th, 1903, and 727,117, dated May 5th, 1903). In the make-up of the positive electrodes, I made use of a mixture of nickel hydroxid and flake graphite, or other flake-like inert conducting material, as described in my Patent No. 701,804, dated June 3, 1902. In the actual operation of my battery, little or no trouble has been experienced in connection with the negative pole electrode, but great and unforeseen difficulties have been experienced in connection with the positive pole electrode, such difficulties bringing about a gradual falling off in the capacity of the cell. Early in this work it was discovered that flake graphite when subjected to the effect of prolonged electrolysis in an alkaline solution, undergoes a change in its contact resistance, and in searching for a practical substitute for flake graphite, I discovered that films or flakes of metallic cobalt or cobalt-nickel alloy were not open to this objection, and I have therefore claimed the same in my application for Letters Patent filed March 30th, 1905, Serial No. 252,935, Patent No. 857,929, June 25, 1907. More recently I have discovered that a further objection to the use of flake graphite resides in the fact that the scales slip with relative facility on each other, and therefore increase the liability of structural changes within the mass, which I have now found to be practically fatal to successful operation, as will be presently explained.

In making up a positive pole electrode after the manner described in my patents above referred to, I subjected the mass to a pressure of about 4,000 pounds per square inch to consolidate the mass into a more or less coherent cake, but the contact pressure on the surface of such a mass would obviously be only that which would be imposed by the elasticity of the pocket walls, and hence would amount to only a few ounces. Consequently, great difficulty would naturally be experienced in securing a good surface contact of sufficient area and pressure with such an arrangement, entirely aside from contact difficulties which I have now discovered exist within the mass itself, as I shall point out. Also, with such an arrangement the generation of gas within the mass, resulting in considerable variation in volume of the latter would tend to, and in practice did, increase the contact difficulties.

In an application filed by Jonas W. Aylsworth and myself, April 28th, 1905, Serial No. 257,807, we described an electrode element in which the attempt was made to overcome the contact difficulties existing between the active mass and the pocket walls by making use of a tubular pocket, forming a non-elastic holder and by securing an elastic pressure between the active material and the walls of such a holder by reason of the internal gas pressure developed within the active material, and also, by reason of the elasticity of the conducting flakes or films. While such an arrangement would relieve the difficulties due to uncertain and imperfect contact between the active material and the pocket walls, it did not overcome the difficulties which I have now discovered to exist within the active mass, and particularly, when metallic flakes, such as cobalt and cobalt-nickel alloy are used, instead of flake graphite. These latter difficulties I find are attributable to structural changes in the disposition of the particles of active material in use, and to ineffective arrangement of these particles during manufacture. The former difficulty arises from the fact that when the mass is compressed within the pockets with certain portions of the particles of active material in contact with the conducting flakes, and certain portions of the conducting flakes in contact with each other, a very thin, but non-conducting deposit, (the identity of which I have not determined) takes place on those portions of the conducting flakes where the active material or other flakes are not in contact. If, therefore, structural changes take place within the mass, due to gas pressure, mechanical shock or electrolytic action, the active particles are liable to be brought into contact with the non-conducting portions of the flakes or films, or the non-conducting portions of the latter will be brought together so as to obviously affect the conductivity of the mass to a serious extent.

The second difficulty, namely, imperfect disposition of the active particles in the first instance, has been encountered by reason of the substitution of flake cobalt or cobalt-nickel flakes for flake graphite. In the case of flake graphite, the flakes are excessively thin and highly flexible, and it is possible to very perfectly "cover" the active particles with flake graphite by the employment of a sticky material like molasses or glucose, by which the graphite flakes will be caused to intimately adhere to the active particles, the sticky material being dissolved out after the compression of the mass in the pockets, as I describe in my application filed March 30th, 1905, Serial No. 252,931, Patent No. 839,371, Dec. 25, 1906. An active mass with which graphite has been thus admixed will be characterized in the respect that practically the entire surface of each active particle will be in contact with the graphite, owing to the flexibility of the latter, and the ease with which the graphite flakes adapt themselves to following the contours of the active particles. Consequently, but little pressure is required to effectively consolidate such an active mass, employing flake graphite, and a substantial increase in the consolidating pressure would not materially affect the conductivity of the mass. In the case of metallic flakes, such as cobalt, nickel, or cobalt-nickel alloy, the conditions are entirely different, owing to the practical impossibility of using metallic flakes as thin and as flexible as graphite flakes. Metallic flakes, in order to be of sufficient strength to prevent them from being objectionably torn and disrupted by the consolidating pressure, must necessarily be several times thicker than graphite flakes, which can be effectively used. Consequently, the metal flakes are relatively non-flexible and when the attempt is made to "cover" the active particles with such flakes, it is found that the active particles present many surfaces which do not make contact with the flakes. In some instances, an active particle may adhere to a flake only at one of its corners or along one of its edges, so that the proportion of its exposed surface through which the current may enter will be relatively small. To effectively consolidate an active mass using metallic flakes, requires, therefore, great pressure, and this pressure must be sufficient to actually deform or crush the active particles, so as to thereby increase the area of the surfaces in contact with the conducting flakes. Furthermore, this consolidating pressure must be sufficient to substantially close up the active mass, whereby the smaller active particles will also be brought into good contact with the conducting flakes, instead of being practically isolated from the conducting flakes, or at least kept from effective contact therewith by reason of the presence of the larger particles. In short, the essential difference between the use of flake graphite and metallic flakes, is that while with the former the graphite flakes, being highly flexible, conform to the irregularities of the active particles; in the case of metallic flakes, it is necessary to distort the shape of the active particles to make the latter conform to the conducting flakes.

As a result of my more recent observations, the ideal conditions which should exist in a storage battery electrode, may be thus stated:

(1) The maximum amount of active material should be contained in each pocket, the diameter of which should be sufficiently small and the porosity of the active mass sufficiently great as to permit the electrolyte to readily penetrate the entire mass, and also, minimize the length of the paths to be followed by the current.

(2) No opportunity should be allowed for any relative shifting of the active particles or conducting flakes, or other physical change within the active mass. In other words the initial conducting paths which are to be followed by the current having been once established, should remain unchanged, because as I have pointed out, if opportunity for relative movement is allowed, many of these conducting paths will no longer exist, nor will they be replaced by others.

(3) The mass should present such a disposition of its particles as to cause the latter to be brought into good contact with the conducting metallic flakes, the combined contact surface being of sufficient area as to permit the electrolytic effect to take place within the entire mass, and none of the particles, or at least an objectionable proportion thereof, being isolated from the conducting paths presented by the metallic flakes, or being so lightly pressed into contact therewith as to prevent such particles from being properly acted upon by the current.

(4) Opportunity should be allowed for the relatively free escape of gas within the active mass without affecting the contact between the particles, because unless this is done, the gas pressure may reach a dangerously high point.

(5) The metal forming the pockets should be so proportioned as to resist whatever tendency there is in the mass to swell by absorption of the electrolyte and of oxygen during the charging operation and by reason of gas pressures.

In order to realize these ideal conditions in practice, I make use of tubular electrode pockets, formed of a perforated strip of steel about .004 of an inch in thickness, first carefully plated with an alloy of cobalt and nickel, after which the strips are subjected to a welding temperature in a hydrogen atmosphere, being then formed into tubes. The tubes in question are preferably about four inches long and about one-quarter of an inch in internal diameter. Into these tubes, I introduce in succession very small increments under an enormous tamping pressure, the active mixture consisting of relatively large particles of nickel hydroxid, (for instance, the product passing a thirty-mesh screen) and conducting flakes preferably of cobalt or cobalt-nickel alloy, passing a fifteen-mesh screen, the latter adhering to the active particles by the use of a sticky material, such as glucose or molasses, as described in my application for Letters Patent, filed March 30th, 1905, Serial No. 252,931, Patent No. 839,371, Dec. 25, 1906. Ordinarily, about eight (8) grams of the mixture will be introduced within each tube, the tamping pressure applied being upwards of one-thousand pounds on each increment. This pressure not only closely packs the active material within the tubes, but also breaks down or deforms the larger particles, so as to close up the interstices between the same, so far as will be permitted by the presence of the sticky material, and consolidate the mass as a whole, to bring all the active particles in good contact with the conducting paths progressed by the current. At the same time it forces the active particles through the films of sticky material into contact with the conducting films and thereby displaces the sticky material which accumulates in the many minute interstices presented between the particles of the active mass. The viscosity of the sticky material prevents it from being squeezed out of the mass and from entering the pores of the active particles. As thus formed, the mass presents a very compact composite body under great pressure, and containing minute connected bodies of the sticky material as displaced by the pressure. Consequently, when the sticky material is removed by soaking it out, as will be explained, it results in the formation of a net-work of minute connected channels, crevices and pockets, which are important in permitting a free escape for gas, and at the same time allowing a rapid circulation of the electrolyte to accommodate discharges at an exceedingly high rate. The open spaces within the mass which are thus formed may occupy 25 per cent. or more of the entire mass. The use of a sticky material is, therefore, important for a two-fold purpose, and if none were used— or an insufficient amount were used—the mass would be too non-porous to permit a sufficiently rapid circulation of the electrolyte to accommodate desired high discharge rates. On the other hand, care must be exercised not to use so much of the sticky material as to honey-comb the mass to too great an extent, as thereby the mass would be weak structurally, and there would be liability of the active particles and conducting flakes moving relatively, with the objection pointed out. The tamping pressure also results in forcing the active mass into intimate contact with the conducting walls of tubular pockets, so as to secure good electrical contact with the same. When the active mass has been subjected to this pressure, and after the removal of the sticky material, it constitutes a porous, coherent body, about as hard as soap-stone, and cutting with about the same facility. It is in fact, so hard that it may be polished without crumbling. Under the microscope, the cobalt flakes appear as a delicate tracery of vein-like conductors, extending in all directions throughout the mass and forming a net-work of conductors.

When the desired amount of material has been tamped within the pockets under enormous pressure, as explained, a small cup-like diaphragm of sheet nickel, also plated with cobalt-nickel alloy, is introduced within the ends of the tubes and compressed tightly upon the active mass, after which the ends of the tube are squeezed flat to lock the diaphragms in place to prevent any loosening of the material at the ends, as might be the case unless some means were provided for this purpose. The tubes are now assembled in a suitable support or grid, (examples of which are described in said application of Edison and Aylsworth) and the electrodes are immersed in water, slightly alkaline, so as to dissolve out the molasses, glucose, or other sticky material. In use, the absorption of the electrolyte by capillarity, effects a swelling of the active particles, and also, the absorption of oxygen during the charging operation results in a slight further increase in the bulk thereof. Any swelling of the active mass, however, is insufficient to impose any more than a very desirable pressure on the pocket walls (probably upwards of 30 to 40 pounds, as compared to a few ounces with the former arrangement) without, however, straining the tubes to an objectionable extent. The swelling referred to is not enough, however, to close up the interstices formed in the mass by the removal of the sticky material, as explained, and therefore does not interfere with the perfect and rapid circulation of the electrolyte, nor with the escape of gas. As a matter of fact, the particles of nickel hydroxid are themselves quite porous, but not to a sufficient extent, if alone relied upon, to permit the electrolyte to circulate with sufficient rapidity throughout the mass; but by providing the mass with connected passages exending throughout the same, the electrolyte is enabled to readily and rapidly penetrate the mass in all directions, so that the porosity of each particle has only to be relied upon to furnish the necessary supply of the solution to its own minute mass.

In order that the invention may be better understood, attention is directed to the accompanying drawing, forming part of this specification, and in which—

Figure 1, is an end elevation of two coöperating positive and negative grids, the former utilizing the improved electrode elements, and the latter the concaved corrugated pockets described in my former patents, above referred to, Fig. 2, a plan view of a portion of the positive pole grid, showing two of the electrode elements, Fig. 3, a plan view of the two grids shown in Fig. 1, Fig. 4, a cross-sectional view on a greatly enlarged scale through the electrode element, showing one form of joint, Fig. 5, a corresponding view showing a modified joint, Fig. 6, a longitudinal sectional view through the upper part of one of the electrode elements, showing one of the end cups or diaphragms engaging the compressed mass, and Fig. 7, a front elevation of one of the electrode elements illustrating the use of a spiral joint for increasing the strength of the tubes.

In all of the above views corresponding parts are represented by the same numerals of reference.

Each electrode element is composed of a tube 1, made preferably of a strip of steel about .004 of an inch in thickness, each tube being of a length of about four inches and an integral diameter of about one-quarter of an inch. The strip before being formed into tubular shape, is closely perforated and preferably carefully plated with a cobalt-nickel alloy, welded in place by subjecting the strip to a welding temperature in a hydrogen atmosphere. The joint 2, of each tube may extend longitudinally thereof.

The tube may be formed with a flattened double lapped joint as shown in Fig. 4, or instead, the joint 2 may extend spirally around the tube (see Fig. 7) being constructed in any suitable machine for the purpose, whereby increased strength will be afforded and somewhat thinner material may be used.

Or instead, a joint such as shown in Fig. 5 may be used, wherein the edges 3—3 of the tube are bent back on the body of the tube and are united by a separate binding strip 4, compressed in place. With a tube of the dimensions stated, the active mass 5 will amount to about two grams per inch. This active mass is composed of particles or granules of nickel hydroxid, which have been first screened so as not to secure too great a variation in the size of the active particles, and which are first coated with a sticky material, such as molasses or glucose, preferably the latter, and are then intimately mixed with a suitable proportion of cobalt or cobalt-nickel flakes, so as to effectively cover the surfaces of the particles. The best proportion of the mixture for introduction into the tubes, is 60 per cent. by weight of crushed nickel hydroxid, screened through a 30-mesh screen, 20 per cent. of flake cobalt or flake cobalt and nickel, and 20 per cent. of a very viscous glucose sufficiently sticky to fasten the flakes to the nickel granules and prevent their detachment during manufacture. The active mass so formed is now introduced into the tube in relatively small increments.

Where a single tamping operation is performed, on each increment, I find that the best results are secured when about one-hundred increments of the active mass are successively introduced within the tube, but where each increment is tamped twice, fifty increments may be successively introduced, the latter procedure being preferable. The filling and tamping of the increments of active material within the tubes may be simultaneously performed in connection with a number of tubes in an apparatus of the type described in my application for Letters Patent, filed October 14th, 1905, Serial No. 282,672. The pressure applied to each increment of active material is preferably in excess of a thousand pounds, or more than 20,000 pounds per square inch, the equivalent of such pressure being secured by means of plungers weighing three pounds each and falling from a height of five inches, the tamping face being slightly less than one-quarter of an inch in diameter. In this way I obtain an enormous compression on each extremely small increment, and by delivering the tamping blow practically instantaneously, no opportunity is offered for distortion or breakage of the relatively small plungers. Preferably, before the tubes are thus filled and tamped, a number of seamless nickel rings 6, fitting the tubes snugly, are slipped over the same, being very firmly held in position by reason of the slight expansion of the tube, effected by the tamping pressure and adding very materially to the strength of the tube in resisting bursting strains. Preferably, these rings on adjacent tubes are staggered (see Fig. 2) so as to permit the tubes to be arranged parallel very close together. The difference in the physical structure of the active mass formed by applying an enormous tamping pressure on successive and very small increments, (upwards of 20,000 pounds per inch) and the application on the entire active mass of a relatively low pressure (about 4,000 pounds per inch) as heretofore, will be readily appreciated. With the latter pressure, and assuming flakes of cobalt or cobalt-nickel alloy to be used, the mass would not be effectively consolidated, but on the contrary, many of the active particles would be in contact with the cobalt flakes for such a small area as not to permit the particles throughout to be effectively acted upon by the current, while the smaller particles would be maintained in contact with the conducting flakes with so little pressure as to make the contact very poor. Furthermore, with such a pressure the mass would not be sufficiently consolidated as to maintain the desired permanency of contact throughout, and this would be true if flake graphite were used. On the other hand, by applying an enormous pressure to each successive small increment, the mass is so consolidated that the active particles will be compressed and deformed so as to be brought into good contact with the conducting flakes and always maintained tightly compressed in such condition of contact. Furthermore, the mass will be so consolidated, and the particles will be so tightly compressed and squeezed together, that there can be no relative shifting of the active particles and conducting flakes, since the tubes cannot expand or contract, and consequently, the contact condition of the mass will remain unchanged, and there will be no danger of the particles shifting or of the flakes themselves shifting, so as to make contact with those portions of the surfaces of the flakes on which poorly conducting films may have formed, as I have explained. At the same time, the mass as a whole, is not so tightly consolidated as to interfere with the porosity of the active particles by which the electrolyte will be absorbed, and as explained, when the sticky material is removed there will always be present very slight seams and crevices, forming channels through which the gas may escape and permitting rapid circulation of the electrolyte. I find that the consolidation of the mass is materially facilitated by the presence of the glucose, or other sticky material, which apparently has a lubricating effect, permitting the particles under the tamping pressure to more readily shift into their ultimate positions, and also, allowing the individual particles to be more readily compacted or deformed. I find, as a matter of fact, that notwithstanding the added bulk of the sticky material, it is possible to tamp a greater mass of active material into a tube than can be done under the same pressure when the sticky material is not used. After the proper amount of active material has been introduced and tamped within the tubular holder, any excess thereof is removed at the upper end by reaming, and a nickel cup or diaphragm 7, having sharpened turned over edges, is forced in upon the active mass at each end, and tightly compressed upon the same, as shown. The ends of the tubes are now turned over at 8, to engage the end cups 7, holding the active mass firmly against longitudinal expansion within the tubes. A number of the tubes 1, so manufactured, are assembled in a grid 9, in any suitable way, examples of which are disclosed in the application of Edison and Aylsworth, above referred to. The preferable arrangement consists in providing the grid with integral clamping members 10, which are tightly compressed upon the flattened ends of the tubes. In assembling the several pockets the joints 2 may be arranged at the sides instead of facing the negative electrode 11, as shown, so that in case any of the tubes should give way at the joint, there would be no danger of short circuiting with the negative electrode; and such an arrangement might be desirable if the reinforcing rings 6 were not used.

Having now described my invention, what I claim as new therein and desire to secure by Letters Patent is as follows:

1. An electrode element, comprising a perforated inclosing pocket non-deformable under normal working conditions, containing a highly compressed mass of active material and a net-work of conducting paths formed of overlapping flakes extending throughout the active mass and in contact with the pocket walls and with which the particles of active material are deformably compressed into intimate contact, substantially as set forth.

2. An electrode element, comprising a perforated inclosing pocket non-deformable under normal working conditions, containing a highly compressed mass of active material, formed with a net-work of minute circulating passages extending throughout the same and constituting a substantially predetermined porosity, and a net-work of conducting paths formed of overlapping flakes extending throughout the active mass and with which the particles are deformably compressed into intimate contact, substantially as set forth.

3. An electrode element, comprising a perforated inclosing pocket non-deformable under normal working conditions, containing a highly compressed mass of active material therein of such density as to prevent relative shifting of the active particles under the effect of disturbing influences, and a net-work of conducting paths formed of overlapping flakes and extending throughout the mass and with which the active particles are in intimate contact, substantially as set forth.

4. An electrode element, comprising a perforated inclosing pocket non-deformable under normal working conditions, containing a highly compressed mass of nickel hydroxid, and a net-work of conducting paths formed of overlapping flakes extending throughout the active mass and in contact with the pocket walls and with which the active particles are deformably compressed in intimate contact, substantially as set forth.

5. An electrode element, comprising a perforated inclosing pocket non-deformable under normal working conditions, containing a highly compressed mass of nickel hydroxid, formed with a net-work of minute circulating passages extending throughout the same, and constituting a substantially predetermined porosity, and a net-work of conducting paths formed of overlapping flakes extending throughout the active mass and with which the particles are deformably compressed into intimate contact, substantially as and for the purposes set forth.

6. An electrode mass comprising a perforated inclosing pocket non-deformable under normal working conditions, containing a highly compressed mass of nickel hydroxid therein of such density as to prevent relative shifting of the active particles under the effect of disturbing influences, and a net-work of conducting paths formed of overlapping flakes extending throughout the mass, and with which the active particles are in intimate contact, substantially as set forth.

7. An electrode element comprising an inclosing pocket non-deformable under normal working conditions and having compressed ends, a highly compressed mass of active material therein and cups or diaphragms tightly compressed against the extremities of the active mass and held in position by the compressed ends of the pocket, substantially as set forth.

8. An electrode element, comprising an inclosing pocket non-deformable under normal working conditions, a series of strengthening rings encircling the same, and active material tightly compressed within the pockets so as to cause the pocket walls to tightly engage said rings, substantially as set forth.

9. A storage battery electrode, comprising a grid or support carrying a series of electrode elements each formed of a perforated inclosing pocket non-deformable under normal working conditions containing active material tightly compressed therein, and having a series of strengthening rings encircling the same, said rings on adjacent pockets being staggered so as to overlap, substantially as set forth.

This specification signed and witnessed this 31st day of October 1905.

THOMAS A. EDISON.

Witnesses:
FRANK L. DYER,
ANNA R. KLEHM.